M. M. LEHMAN.
STICK CANDY.
APPLICATION FILED MAR. 24, 1913.
1,072,338.
Patented Sept. 2, 1913.
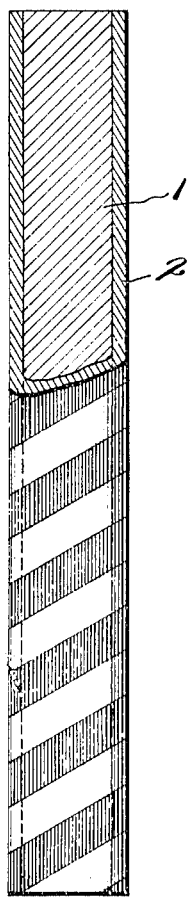
Witnesses
Edwin J. Beller
H. W. Primm
Inventor
M. M. Lehman.
By Wilkinson, Witherspoon & MacKay
Attorneys.

UNITED STATES PATENT OFFICE.

MAURICE M. LEHMAN, OF SELMA, ALABAMA.

STICK-CANDY.

1,072,338.   Specification of Letters Patent.   Patented Sept. 2, 1913.

Application filed March 24, 1913. Serial No. 756,479.

*To all whom it may concern:*

Be it known that I, MAURICE M. LEHMAN, a citizen of the United States, residing at Selma, in the county of Dallas and State of Alabama, have invented certain new and useful Improvements in Stick-Candy; and I do hereby declare the following to be a full, clear, and exact description of the invention, such as will enable others skilled in the art to which it appertains to make and use the same.

My invention relates to an improved stick candy containing peanut butter, and in the process of manufacturing the same.

The object of my invention is to provide a novel and highly attractive form of stick candy having the individual and distinctive taste of peanut butter.

The accompanying drawing forming a part of this application illustrates a candy stick provided with a core 1 and protective coating 2 formed according to my invention.

In the preferable operation of my improved process, I dissolve substantially fifty pounds of granulated sugar and one ounce of cream of tartar in water and cook the mass in a vacuum pan at a temperature of approximately 260° F. under a vacuum of 24 inches. I then draw off the batch of cooked candy and allow it to cool on a slab. This treatment of the sugar and cream of tartar produces a soft pliable candy adapted to be readily worked uniformly throughout a quantity of peanut butter. I then work a small quantity of the candy uniformly throughout a quantity of peanut butter to give the latter the required consistency or body, and form the worked mixture into cylindrical cores. This produces a core or filling for stick candy having substantially the individual and distinctive taste of pure peanut butter, and containing only a quantity of candy sufficient to provide the required body. The remainder of the batch of candy is then pulled and placed around the peanut butters cores; being finally spun out to produce a coating or jacket of the desired thickness.

My above described invention provides an improved stick candy in which the ductile coating of pulled candy, spun on the exterior of the peanut butter core protects the latter from the access of air, and the soft unpulled candy incorporated uniformly throughout the entire mass of the core effectively prevents the spreading therethrough of any local deterioration of the peanut butter caused by chipping off or penetration of parts of the exterior protective coating.

My invention thus provides an improved stick candy having the individual and distinctive taste of pure peanut butter, and in which the peanut butter will be unaffected by atmospheric conditions.

I claim:—

1. Stick candy consisting of a core of peanut butter having a quantity of soft candy uniformly incorporated throughout its mass to give it body, and having an exterior protective coating of pulled candy.

2. The process of making stick candy by cooking substantially fifty pounds of granulated sugar and one ounce of cream of tartar at a temperature of approximately 260° F. under a vacuum of 24 inches, working a portion of such cooked candy uniformly throughout a quantity of peanut butter, forming such worked mixture into cores, pulling another portion of such cooked candy, and spinning such pulled candy on said cores to provide a protective coating.

In testimony whereof, I affix my signature, in presence of two witnesses.

MAURICE M. LEHMAN.

Witnesses:
M. M. KEIPP,
L. BOUTWELL.